US012243203B2

(12) United States Patent
Aluru et al.

(10) Patent No.: US 12,243,203 B2
(45) Date of Patent: Mar. 4, 2025

(54) VIEWING SYSTEM TO DYNAMIC REAL TIME OPTIMIZE IMAGE QUALITY FOR EVERY CUSTOMER VIEWPORT

(71) Applicant: GM GLOBAL TECHNOLOGY OPERATIONS LLC, Detroit, MI (US)

(72) Inventors: Sai Vishnu Aluru, Commerce Township, MI (US); Justin Keith Francisco, White Lake, MI (US); Joseph G Machak, Oakland Township, MI (US); Eyal Lubelski, Kiryat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 392 days.

(21) Appl. No.: 17/662,744

(22) Filed: May 10, 2022

(65) Prior Publication Data

US 2023/0368345 A1 Nov. 16, 2023

(51) Int. Cl.
*G06T 5/92* (2024.01)
*G06T 5/50* (2006.01)
*G06T 7/12* (2017.01)
*G06V 10/25* (2022.01)
*G06V 10/75* (2022.01)

(52) U.S. Cl.
CPC .................. *G06T 5/92* (2024.01); *G06T 5/50* (2013.01); *G06T 7/12* (2017.01); *G06V 10/25* (2022.01); *G06V 10/751* (2022.01); *G06T 2207/30168* (2013.01); *G06T 2207/30252* (2013.01)

(58) Field of Classification Search
CPC .... G06T 5/92; G06T 5/50; G06T 7/12; G06T 2207/30168; G06T 2207/30252; G06T 5/94; G06T 7/11; G06T 7/13; G06T 7/155; G06T 2207/30248; G06V 10/25; G06V 10/751; G06V 20/56; G06V 10/44
See application file for complete search history.

(56) References Cited

U.S. PATENT DOCUMENTS

| 10,498,948 | B1 * | 12/2019 | Celik | H04N 23/673 |
| 12,059,298 | B2 * | 8/2024 | Poland | A61B 8/4455 |
| 12,060,060 | B1 * | 8/2024 | Costantino | B60W 30/0956 |
| 2017/0161569 | A1 * | 6/2017 | Ren | G06V 20/62 |
| 2017/0186226 | A1 * | 6/2017 | Cashman | G06V 40/113 |
| 2020/0053293 | A1 * | 2/2020 | Lee | H04N 23/64 |
| 2020/0394411 | A1 * | 12/2020 | Dahlberg | G06V 40/172 |

(Continued)

*Primary Examiner* — Ming Y Hon
(74) *Attorney, Agent, or Firm* — Lorenz & Kopf LLP

(57) ABSTRACT

Systems, methods, and apparatus are provided for real-time adjustment of image quality parameters. The system includes a controller configured to: acquire an image frame, having a fixed-pixel region that defines a region-of-interest, from one or more imaging devices; apply image processing techniques to determine a modified fixed-pixel region that excludes non-relevant object pixels; alter one or more image quality parameters based on statistics of pixels in the modified fixed-pixel region; and provide the altered one or more image quality parameters to the one or more imaging devices for use with subsequent image frames; wherein the one or more imaging devices produce an image that is tuned, based on the altered one or more image quality parameters, to the portions of the image in the region-of-interest that does not include the non-relevant object pixels.

20 Claims, 6 Drawing Sheets

(56) References Cited

U.S. PATENT DOCUMENTS

| | | | |
|---|---|---|---|
| 2021/0329221 A1* | 10/2021 | Arbabian | H04N 13/296 |
| 2022/0304578 A1* | 9/2022 | Shivpure | A61B 5/0075 |
| 2022/0405514 A1* | 12/2022 | Guzik | G06V 20/05 |
| 2023/0114798 A1* | 4/2023 | Nossek | G06T 5/73 |
| | | | 382/100 |
| 2023/0292020 A1* | 9/2023 | Qin | H04N 23/88 |
| 2023/0368486 A1* | 11/2023 | Hsieh | H04N 25/40 |
| 2024/0046689 A1* | 2/2024 | Ali | G06F 3/0629 |

\* cited by examiner

VIEWING SYSTEM TO DYNAMIC REAL TIME OPTIMIZE IMAGE QUALITY FOR EVERY CUSTOMER VIEWPORT

INTRODUCTION

The technical field generally relates to systems, methods, and apparatuses for imaging systems and more particularly relates to systems, methods, and apparatuses for adjusting image quality parameters in real time.

Image quality parameters for an image provided by a camera may be continuously decided from statistical calculations of pixels pertaining to a fixed region of interest. When image quality parameters are decided based on a region of interest other than a viewport, the image/video may be deteriorated due to changes in scenic lighting throughout the field of view of the camera.

It is therefore desirable for improved methods, systems, and apparatuses for adjusting image quality parameters in real time based on a viewport. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are methods, systems, and related control logic for real-time adjustment of image quality parameters for images taken by image sensors. The disclosed methods, systems, and related control logic can be applied to vehicle cameras, vehicle systems, motor vehicles, vehicle image sensors and other cameras and image sensors that are not associated with motor vehicles.

In one embodiment, a system for real-time adjustment of image quality parameters for images taken by image sensors is provided. The system includes a controller configured to: acquire an image frame, having a fixed-pixel region that defines a region-of-interest, from one or more imaging devices (e.g., cameras); apply image processing techniques to determine a modified fixed-pixel region that excludes non-relevant object pixels (e.g., vehicle, body sections, motorhome, luggage, and others); alter one or more image quality parameters based on statistics of pixels in the modified fixed-pixel region; and provide the altered one or more image quality parameters to the one or more imaging devices for use with subsequent image frames; wherein the one or more imaging devices produce an image that is tuned, based on the altered one or more image quality parameters, to portions of the image in the region-of-interest that does not include the non-relevant object pixels.

In one embodiment, the non-relevant object pixels include vehicle related pixels.

In one embodiment, to apply image processing techniques to determine a modified fixed-pixel region that excludes non-relevant object pixels, the controller is configured to: apply image processing techniques to determine a boundary for the region-of-interest in the fixed-pixel region that excludes non-relevant objects (e.g., vehicle body sections, motorhome, luggage, and others); and resize the fixed-pixel region in accordance with the boundary determined based on the image processing techniques to remove the non-relevant objects when non-relevant objects are detected in the image frame.

In one embodiment, to apply image processing techniques to determine a modified fixed-pixel region that excludes non-relevant object pixels, the controller is further configured to: apply object recognition techniques to recognize non-relevant objects (e.g., mirror or tires) in the fixed-pixel region; and modify the fixed-pixel region by removing pixels related to any recognized non-relevant objects from the fixed-pixel region.

In one embodiment, the image processing techniques to determine a boundary for the region-of-interest include edge contouring processing techniques.

In one embodiment, the image processing techniques to determine a boundary for the region-of-interest further include morphological processing techniques.

In one embodiment, the one or more image quality parameters include a tone-mapping parameter and/or an auto-exposure parameter.

In one embodiment, the controller is further configured to: receive an indication that a series of images are to be captured for use with a consuming device; and instruct a vehicle to interact with the one or more imaging devices to acquire a plurality of image frames for the viewport.

In another embodiment, a method for real-time adjustment of image quality parameters for images taken by image sensors is provided. The method includes: acquiring an image frame, having a fixed-pixel region that defines a region-of-interest, from one or more imaging devices (e.g., cameras); applying image processing techniques to determine a modified fixed-pixel region that excludes non-relevant object pixels; altering one or more image quality parameters based on statistics of pixels in the modified fixed-pixel region; providing the altered one or more image quality parameters to the one or more imaging devices for use with subsequent image frames; and producing an image that is tuned, based on the altered one or more image quality parameters, to portions of the image in the region-of-interest that does not include the non-relevant object pixels.

In one embodiment, the non-relevant object pixels include vehicle related pixels.

In one embodiment, the applying image processing techniques to determine a modified fixed-pixel region that excludes non-relevant object pixels includes: applying image processing techniques to determine a boundary for the region-of-interest in the fixed-pixel region that excludes non-relevant objects (e.g., vehicle body sections, motorhome, luggage, and others); and resizing the fixed-pixel region in accordance with the boundary determined based on the image processing techniques to remove the non-relevant objects when non-relevant objects are detected in the image frame.

In one embodiment, the applying image processing techniques to determine a modified fixed-pixel region that excludes non-relevant object pixels further includes: applying object recognition techniques to recognize non-relevant objects (e.g., mirror or tires) in the fixed-pixel region; and modifying the fixed-pixel region by removing pixels related to any recognized non-relevant objects from the fixed-pixel region.

In one embodiment, the applying image processing techniques to determine a boundary for the region-of-interest in the fixed-pixel region that excludes non-relevant objects includes applying edge contouring processing techniques.

In one embodiment, the applying image processing techniques to determine a boundary for the region-of-interest in the fixed-pixel region that excludes non-relevant objects further includes applying morphological processing techniques.

In one embodiment, the altering one or more image quality parameter based on statistics of pixels in the modified-fixed-pixel region includes: altering a tone-mapping parameter based on statistics of pixels in the modified-fixed-pixel region; and/or altering an auto-exposure parameter based on statistics of pixels in the modified-fixed-pixel region.

In one embodiment, the method further includes: receiving an indication that a series of images are to be captured for use with a consuming device; and instructing a vehicle to interact with the one or more imaging devices to acquire a plurality of image frames for the viewport.

In another embodiment, a vehicle is provided. The vehicle includes: one or more imaging devices (e.g., cameras); and a controller. The controller is configured to: acquire an image frame, having a fixed-pixel region that defines a region-of-interest, from the one or more imaging devices; apply image processing techniques to determine a modified fixed-pixel region that excludes vehicle-related pixels; alter one or more image quality parameters based on statistics of pixels in the modified fixed-pixel region; and provide the altered one or more image quality parameters to the one or more imaging devices for use with subsequent image frames. The one or more imaging devices are configured to apply the altered one or more image quality parameters to produce an image that is tuned to non-vehicle portions of the image in the region-of-interest.

In one embodiment, to apply image processing techniques to determine a modified fixed-pixel region that excludes vehicle-related pixels, the controller is configured to: apply image processing techniques to determine a boundary for the region-of-interest in the fixed-pixel region that excludes vehicle body sections; and resize the fixed-pixel region in accordance with the boundary determined based on the image processing techniques to remove vehicle body sections when vehicle body sections are detected in the image frame.

In one embodiment, to apply image processing techniques to determine a modified fixed-pixel region that excludes vehicle-related pixels, the controller is further configured to: apply object recognition techniques to recognize vehicle-related objects (e.g., mirror or tires) in the fixed-pixel region; and modify the fixed-pixel region by removing pixels related to any recognized vehicle-related objects from the fixed-pixel region.

In one embodiment, the image processing techniques to determine a boundary for the region-of-interest include edge contouring processing techniques.

In one embodiment, the image processing techniques to determine a boundary for the region-of-interest further include morphological processing techniques.

In one embodiment, the one or more image quality parameters include a tone-mapping parameter and/or an auto-exposure parameter.

In another embodiment, a system in a vehicle for real-time adjustment of image quality parameters for images taken by vehicle image sensors is disclosed. The system includes a controller. The controller is configured to: receive an indication that a series of images are to be captured for use with a consuming device; instruct the vehicle to interact with one or more imaging devices to acquire a plurality of image frames for the viewport; acquire an image frame having a fixed-pixel region from the one or more imaging devices; apply edge contouring and morphological processes to determine a boundary for a region-of-interest in the fixed-pixel region that excludes vehicle body sections; resize the fixed-pixel region in accordance with the boundary determined based on the edge contouring and morphological processes to remove vehicle body sections when vehicle body sections are detected in the image frame to generate a resized-fixed-pixel region; apply object recognition techniques to recognize the shape of vehicle-related objects (e.g., mirror or tires) in the resized-fixed-pixel region; modify the resized-fixed-pixel region by removing pixels related to any recognized vehicle-related objects from the resized-fixed-pixel region to generate a modified-fixed-pixel region; alter a tone-mapping parameter based on statistics of pixels in the modified-fixed-pixel region; alter an auto-exposure parameter based on statistics of pixels in the modified-fixed-pixel region; and provide the altered tone-mapping parameter and the altered auto-exposure parameter to the one or more imaging devices for use with subsequent image frames; wherein a tuned image is provided that is tuned (e.g., auto-exposure and tone-mapping) specifically to the non-vehicle portions of the image that is provided in the viewport.

In one embodiment, the indication is triggered in response to user selection of a viewport in a vehicle HMI for display of the images.

In one embodiment, the indication is automatically triggered in response to a predetermined object being detected in a predetermined field of view.

In one embodiment, the tuned image is provided to a display on a vehicle HMI.

In one embodiment, the tuned image is provided to a display on a mobile device (e.g., smartphone).

In one embodiment, the tuned image is provided to a cloud-based server.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Image quality parameters for an image provided by a camera in a motor vehicle may be continuously decided from statistical calculations of pixels pertaining to a fixed region of interest. When image quality parameters are decided based on a region of interest other than a viewport, the image/video may be deteriorated due to changes in scenic lighting throughout the field of view of the camera.

Figure 1:
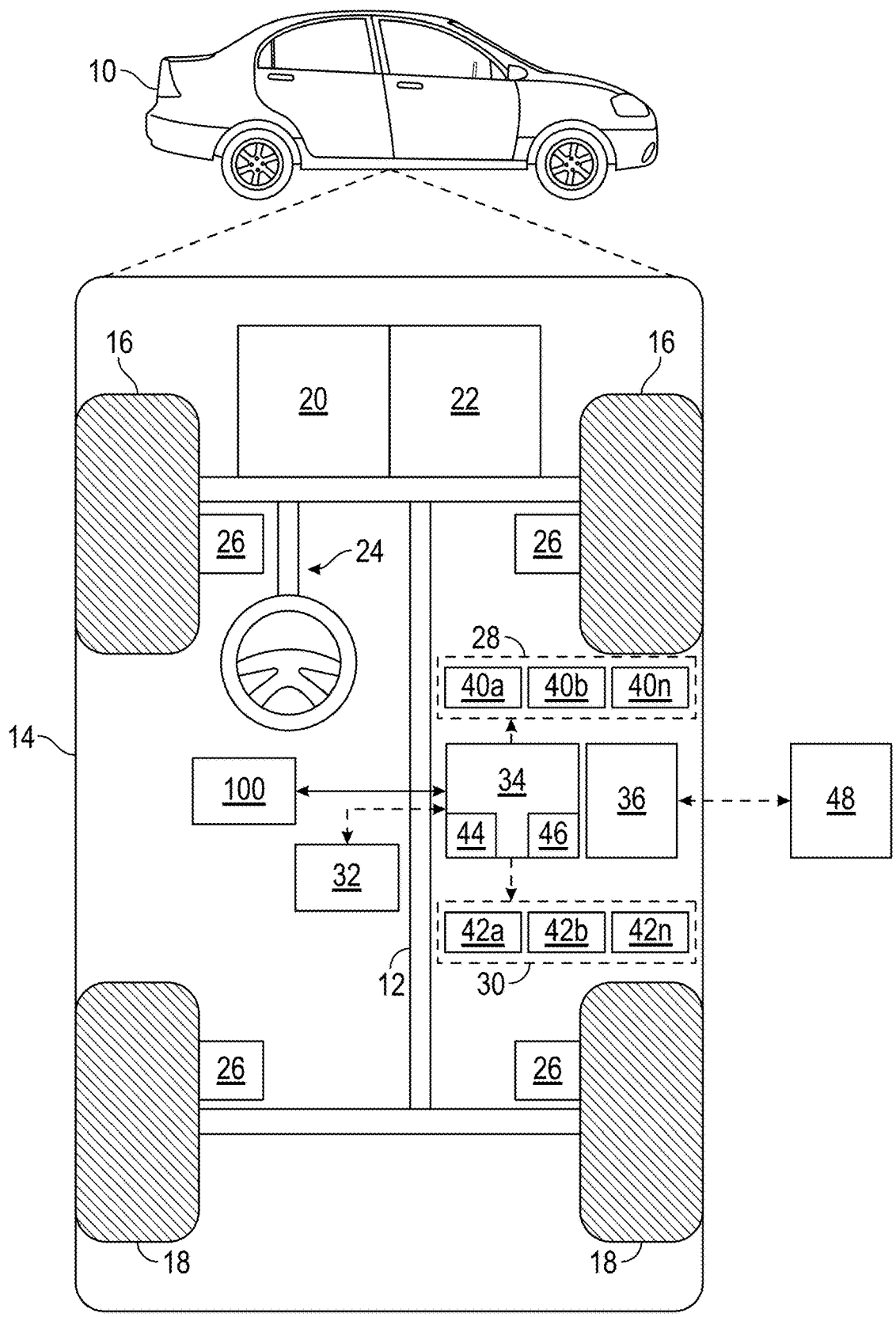
FIG. 1 is a block diagram depicting an example vehicle that includes a real-time image adjustment system, in accordance with an embodiment.

FIG. 1 is a block diagram depicting an example vehicle 10 that includes a real-time image adjustment system 100 for real-time adjustment of image quality parameters for images taken by optical cameras on the vehicle. As depicted in FIG. 1, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 may be capable of being driven manually, autonomously and/or semi-autonomously.

The vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40r that sense observable conditions of the exterior environment and/or the interior environment of the autonomous vehicle 10. The sensing devices 40a-40r can include but are not limited to, radars, lidars, global positioning systems, optical cameras, thermal cameras, ultrasonic sensors (e.g., 40o-40r), inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, and the brake system 26.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 10 to perform a real-time image adjustment process.

The real-time image adjustment system 100 includes a controller that is configured by the programming instructions to: acquire an image frame, having a fixed-pixel region that defines a region-of-interest, from one or more imaging devices (e.g., cameras) on the vehicle; apply image processing techniques to determine a modified fixed-pixel region that excludes vehicle-related pixels; alter one or more image quality parameters based on statistics of pixels in the modified fixed-pixel region; and provide the altered one or more image quality parameters to the one or more imaging devices for use with subsequent image frames.

Additionally, inputs to the real-time image adjustment system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2A:
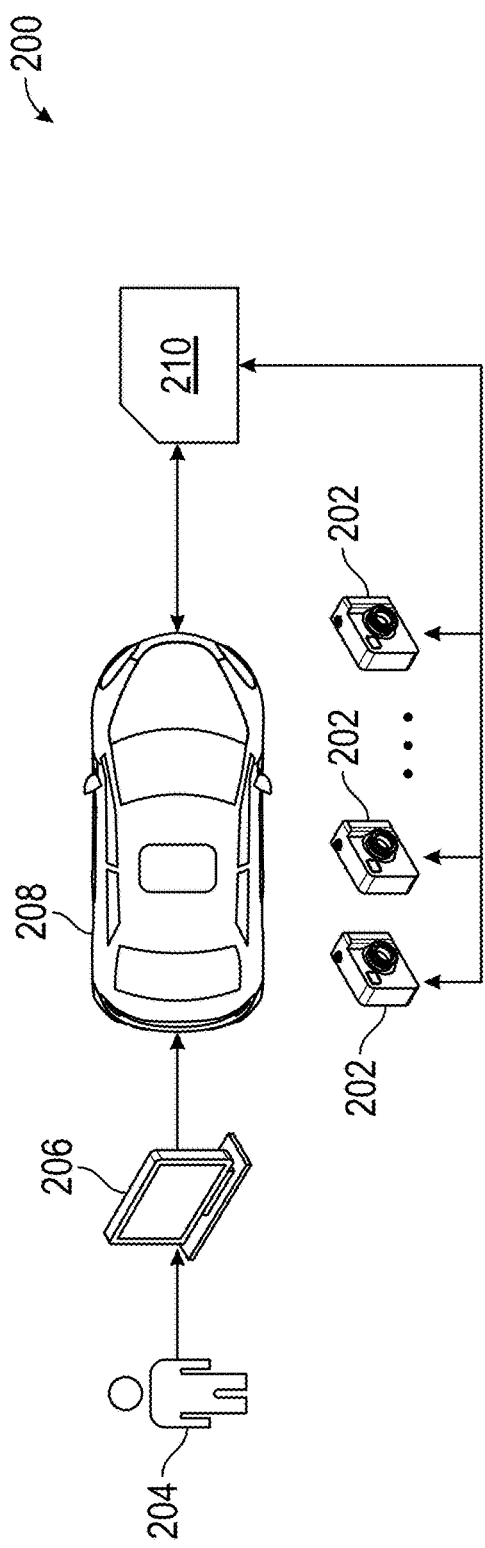
FIG. 2A is a block diagram illustrating an example system that implements a real-time image adjustment system for real-time adjustment of image quality parameters for images taken by optical cameras, in accordance with an embodiment.

FIG. 2A is a block diagram illustrating an example system 200 that implements a real-time image adjustment system 100 for real-time adjustment of image quality parameters for images taken by optical cameras 202 on a vehicle 208. The example system 200 provides images from optical cameras 202 for display to a user 204 on a display screen of an HMI 206 (human machine interface) in the vehicle 208. A real-time image adjustment system 100 in the vehicle 208 implements a real-time image adjustment process 210 wherein a tuned image is provided to the HMI 206 that has one or more image quality parameters (e.g., auto-exposure, tone-mapping, HDR, Gamma table, auto white balance, gain control, and others) that are tuned specifically to the non-vehicle portions of the image that are provided in the viewport of the HMI 206.

In this example, a user 204 initiates a request for a specific viewport (e.g., underneath vehicle view, rear view, trailer view, full display mirror (ISRVM) view port, performance data recorder viewport, bowl view, junction view, cargo bed view, or any rendered view provided using a video feed from a vehicle camera) to be displayed using the HMI 206 in the vehicle 208. Responsive to the request, one or more controllers in the vehicle 208 requests images from the one or more optical cameras 202 to provide the requested viewport. While the viewport is displayed on the HMI 206, a controller implements the real-time image adjustment process 210 to tune the image provided in the viewport by adjusting image quality parameters based on statistics relating non-vehicle portions of the image that are provided in the viewport of the HMI 206. The image quality parameters are tuned based on the pixels being displayed and not based on portions of the field of view (FOV) of the optical cameras 202 that are not displayed in the viewport and not based on vehicular portions of the image. This allows for greater fidelity in the image.

Figure 2B:
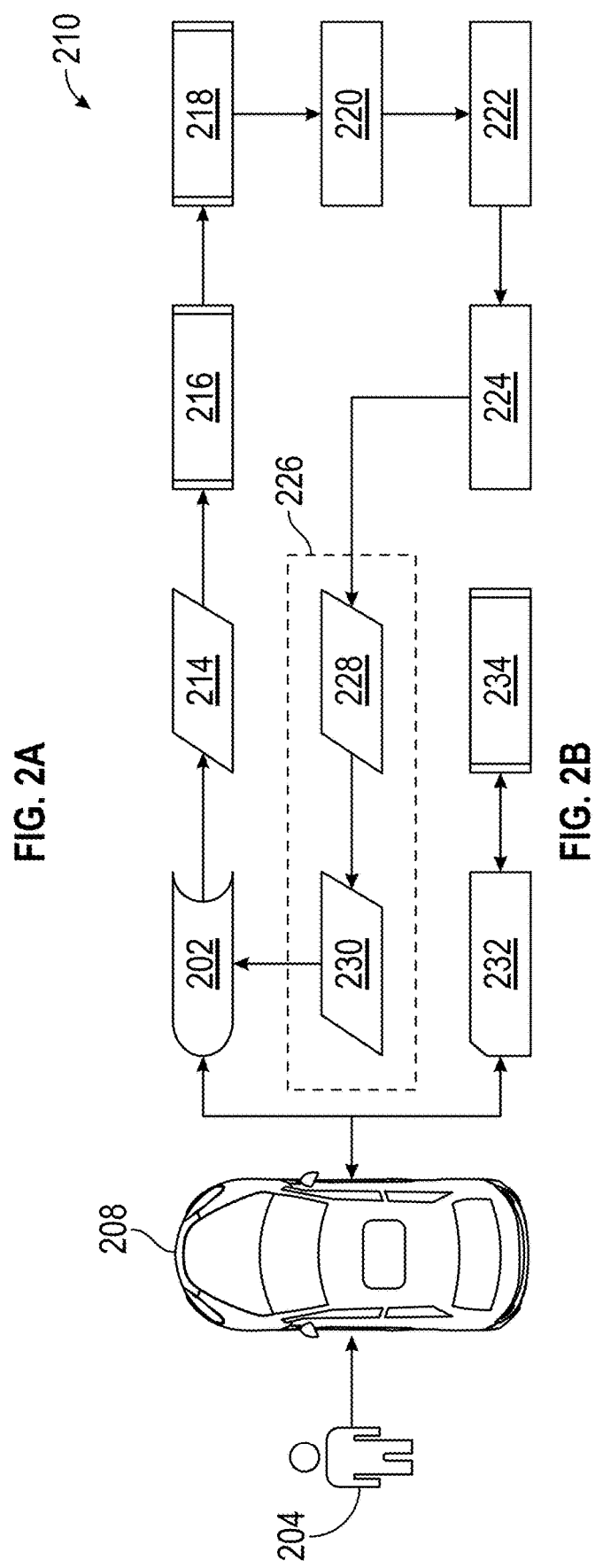
FIG. 2B is a block diagram illustrating an example real-time image adjustment process in a vehicle, in accordance with an embodiment.

FIG. 2B is a block diagram illustrating an example real-time image adjustment process 210 in a vehicle 208. A controller in the vehicle 208 that implements the real-time image adjustment process 210 receives an indication that a series of images are to be captured for use with a consuming device. The indication in this example is triggered in response to selection by a user 204 of a viewport in the vehicle HMI 206 for display of the images. In other examples, the indication may be automatically triggered in response to a predetermined event or a predetermined object being detected in a predetermined field of view. The consuming device in this example is a display on the vehicle HMI 206. In other examples, the consuming device may be a display on a mobile device (e.g., smartphone), a cloud-based server, an ECU (electronic control unit) or some other device.

The example real-time image adjustment process 210 includes frame acquisition of an image frame 214 from one or more optical imaging devices 202 (e.g., camera(s)). The acquired image frame 214 has a fixed-pixel region that defines a region-of-interest for viewing. Each camera has a total FOV and the fixed-pixel region of the image frame 214 has an instantaneous FOV (IFOV). The total FOV is the maximum area of a sample that a camera can image and the IFOV is the subset of the total FOV that is to be displayed on the vehicle viewport via the image frame 214.

The example real-time image adjustment process 210 includes applying image processing techniques to determine a modified fixed-pixel region that excludes vehicle-related pixels. This involves, in this example, applying image processing techniques to determine a boundary for the region-of-interest in the fixed-pixel region that excludes vehicle body sections. The boundary is determined, in this example, by applying an edge/contours detection algorithm 216 and/or a morphological processing algorithm 218.

As is known in the art, edge detection algorithms can identify points where image intensity changes drastically. The points may or may not form a closed shape. Also, as known in the art, contour detection algorithms can identify a closed shape and draw the boundary of an object. Further, as known in the art, morphology is directed to a broad set of image processing operations that process images based on shapes. Morphological image processing algorithms have been developed that can remove imperfections in images.

After the boundary is determined, the process 210 includes resizing the fixed-pixel region if necessary (operation 220). The boundary detection and resizing may remove vehicle body sections when vehicle body sections are detected in the image frame.

The applying image processing techniques to determine a modified fixed-pixel region that excludes vehicle-related pixels, in this example, also includes performing object recognition (operation 222) and modifying the fixed-pixel region by removing pixels related to any recognized vehicle-related objects (e.g., mirror or tires) from the fixed-pixel region (operation 224).

The example real-time image adjustment process 210 includes altering one or more image quality parameters based on statistics of pixels in the modified fixed-pixel region (operation 226). The altered one or more image quality parameters, in this example, includes an altered tone-mapping parameter 228 and an altered auto-exposure parameter 230.

The example real-time image adjustment process 210 includes providing the altered one or more image quality parameters to the one or more cameras 202 for use with subsequent image frames. The one or more cameras 202 may then produce an image for display in the viewport that is tuned, based on the altered one or more image quality parameters, to the non-vehicle portions of the image in the region-of-interest.

The example real-time image adjustment process 210 further includes viewport calibrations (operation 232) and determining pixel coordinates (operation 234) which can be used to set the initial fixed pixel region. The viewport size can be set via the viewport calibrations when the viewport is initiated.

Figure 3A:
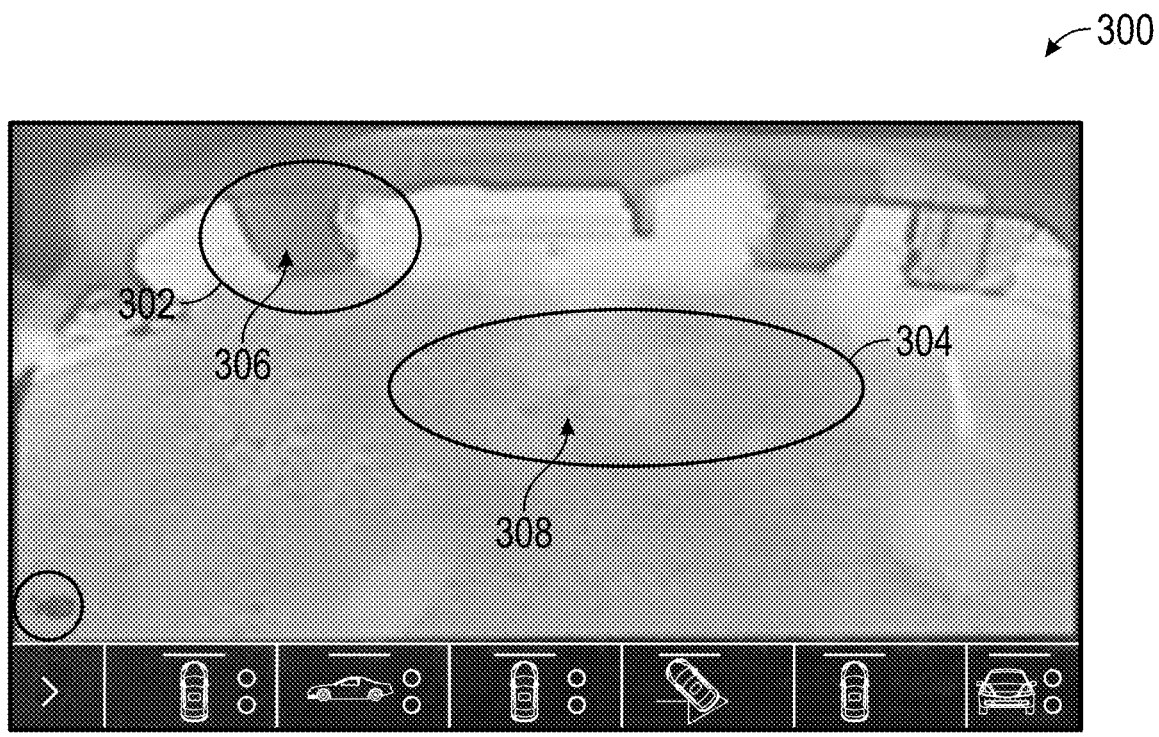
FIG. 3A depicts an example viewport before the application of an example real-time image adjustment process, in accordance with an embodiment.
Figure 3B:
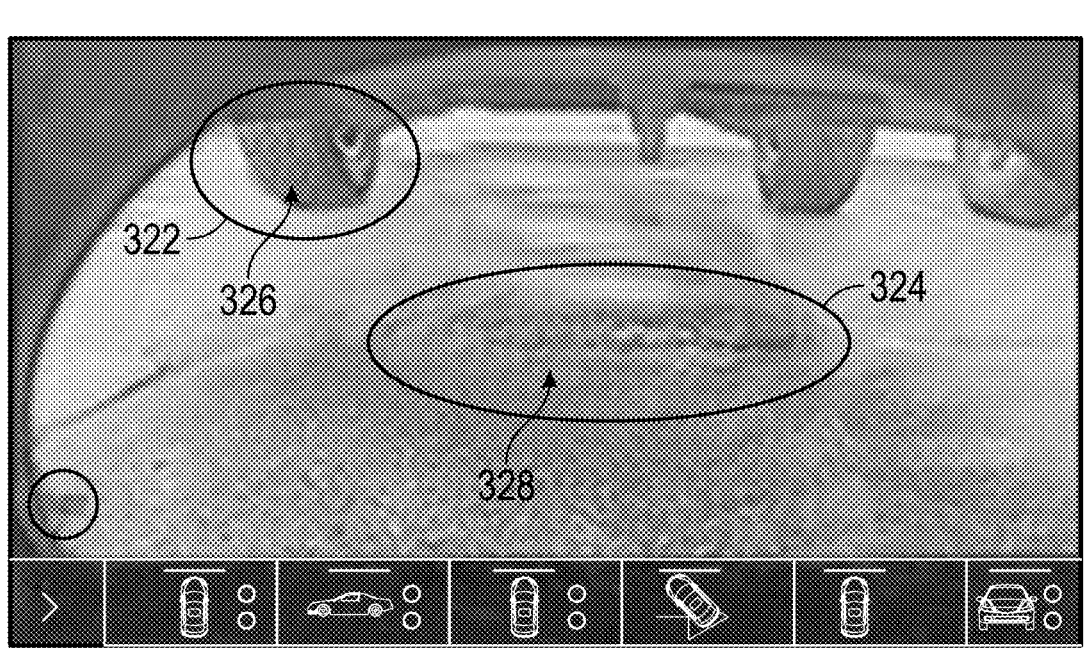
FIG. 3B depicts an example viewport after the application of an example real-time image adjustment process, in accordance with an embodiment.

FIGS. 3A and 3B are diagrams illustrating example viewports 300, 320 depicting a view underneath a vehicle. FIG. 3A depicts the example viewport 300 before the application of an example real-time image adjustment process. FIG. 3B depicts the example viewport 320 after the application of an example real-time image adjustment process.

In the example of FIG. 3A, image quality parameters were tuned based on pixel statistics for the total FOV of a camera. Attention is brought to a first encircled region 302 and a second encircled region 304. Because of the use of untuned image quality parameters, details of a tire 306 in the encircled region 302 are not clear. Also, a crack 308 in the surface of the ground in encircle region 304 is not clear.

In the example of FIG. 3B, image parameters were tuned based on pixel statistics for a modified fixed-pixel region in the IFOV. Attention is brought to a first encircled region 322 and a second encircled region 324. Because of the use of tuned image quality parameters, details of a time 326 in the encircled region 322 is clearer. Also, a crack 328 in the surface of the ground in the encircle region 324 is clearer.

Figure 4:
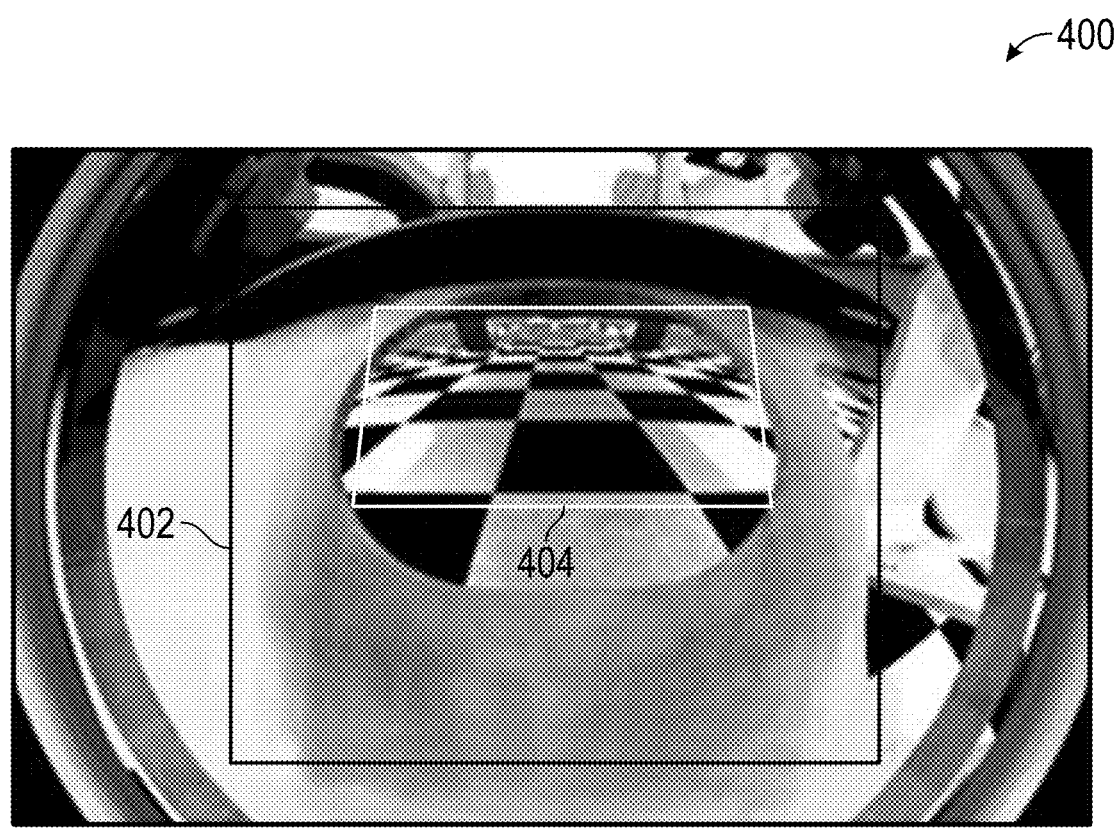
FIG. 4 is a diagram illustrating an example view underneath a vehicle, in accordance with an embodiment.

FIG. 4 is a diagram illustrating an example view 400 underneath a vehicle. In this example a box 402 illustrates the total FOV of the camera that can provide the view 400. Box 404 illustrates the IFOV of the viewport provided to an HMI. By using pixel statistics of an IFOV instead of a FOV to tune image quality parameters, greater image fidelity can be achieved.

Figure 5:
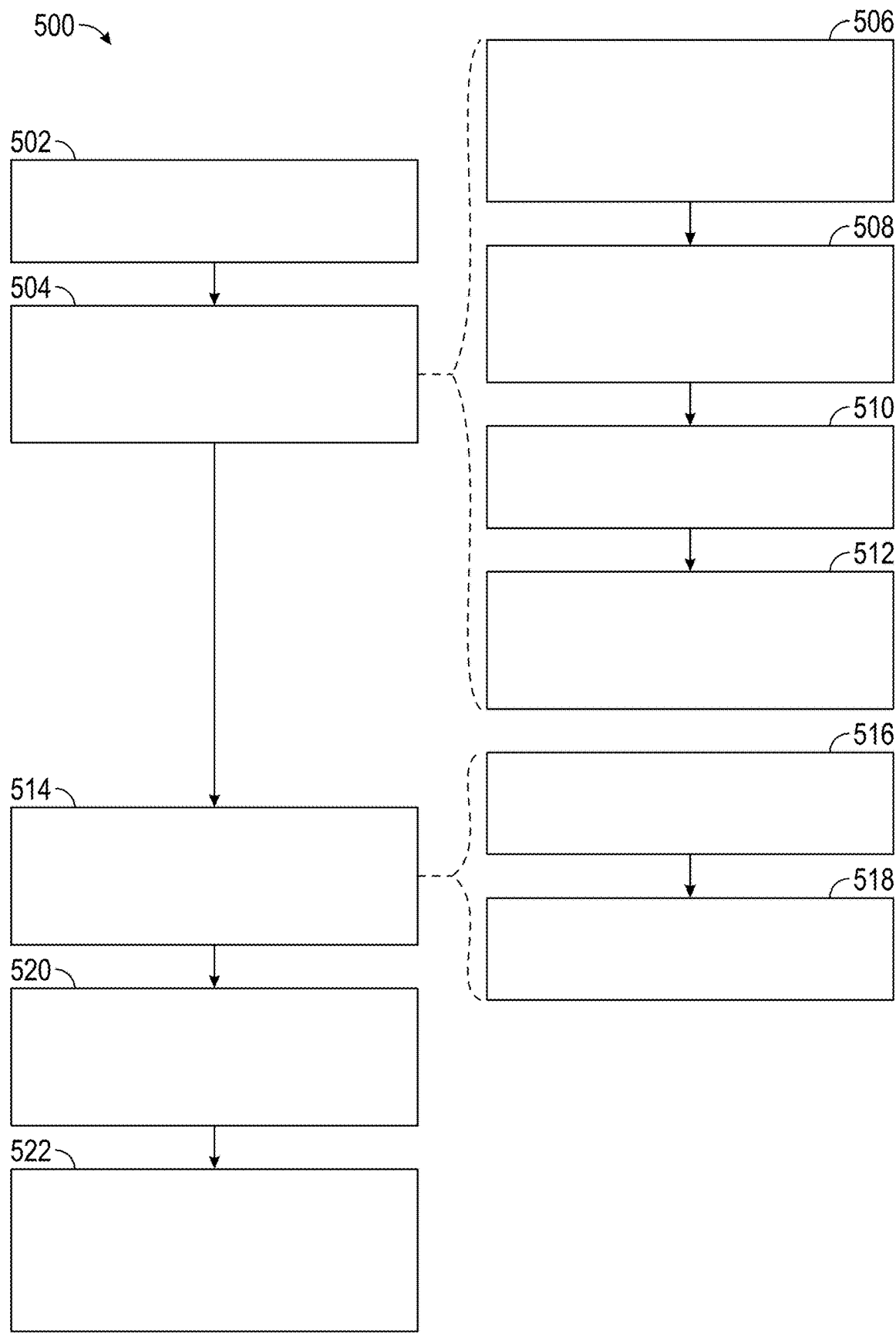
FIG. 5 is a process flow chart depicting an example process in a vehicle for real-time adjustment of image quality parameters for images taken by vehicle image sensors, in accordance with an embodiment.

FIG. 5 is a process flow chart depicting an example process 500 in a vehicle for real-time adjustment of image quality parameters for images taken by vehicle image sensors. The order of operation within process 500 is not limited to the sequential execution as illustrated in the FIG. 5 but may be performed in one or more varying orders as applicable and in accordance with the present disclosure.

The example process 500 includes acquiring an image frame, having a fixed-pixel region that defines a region-of-interest, from one or more imaging devices (e.g., cameras) on the vehicle (operation 502).

The image frame may be acquired after receiving an indication that a series of images are to be captured for use with a consuming device and after an image frame for the consuming device has been acquired from one or more imaging devices responsive to the indication. The indication may be triggered in response to user selection of a viewport in a vehicle HMI for display of the images. The indication may be automatically triggered in response to a predetermined event or a predetermined object being detected in a predetermined field of view. The consuming device may be a display on a vehicle HMI. The consuming device may be a display on a mobile device (e.g., smartphone). The consuming device may be a cloud-based server. The consuming device may be an ECU.

The example process 500 includes applying image processing techniques (to the acquired image frame) to determine a modified fixed-pixel region that excludes vehicle-related pixels (operation 504). The applying (operation 504) may comprise applying image processing techniques to determine a boundary for the region-of-interest in the fixed-pixel region that excludes vehicle body sections (operation 506) and resizing the fixed-pixel region in accordance with the boundary determined based on the image processing techniques to remove vehicle body sections when vehicle body sections are detected in the image frame (operation 508). The applying image processing techniques to determine a boundary for the region-of-interest in the fixed-pixel region that excludes vehicle body sections may include applying edge contouring processing techniques. The applying image processing techniques to determine a boundary for the region-of-interest in the fixed-pixel region that excludes vehicle body sections may also or alternatively include applying morphological processing techniques.

The applying image processing techniques to determine a modified fixed-pixel region that excludes vehicle-related pixels (operation 504) may also comprise applying object recognition techniques to recognize vehicle-related objects (e.g., mirror or tires) in the fixed-pixel region (operation 510) and modifying the fixed-pixel region by removing pixels related to any recognized vehicle-related objects from the fixed-pixel region (operation 512).

The example process 500 includes altering one or more image quality parameters based on statistics of pixels in the modified fixed-pixel region (operation 514). The altering (operation 514) may include altering a tone-mapping parameter based on statistics of pixels in the modified-fixed-pixel region (operation 516). The altering (operation 514) may include altering an auto-exposure parameter based on statistics of pixels in the modified-fixed-pixel region (operation 518).

The example process 500 includes providing the altered one or more image quality parameters to the one or more imaging devices for use with subsequent image frames (operation 520) and producing an image that is tuned, based on the altered one or more image quality parameters, to the non-vehicle portions of the image in the region-of-interest (operation 522). The tuned image may be provided to a display on a vehicle HMI. The tuned image may be provided to a display on a mobile device (e.g., smartphone). The tuned image may be provided to a cloud-based server.

The real-time adjustment of image quality parameters can be applied on a camera by camera basis. This can improve image fidelity when images from multiple cameras are stitched together to create a composite image. In this scenario, the portion of the FOV of a camera that is used for a composite image cam be used as a basis for tuning the image quality parameters for that camera.

Figure 6A:
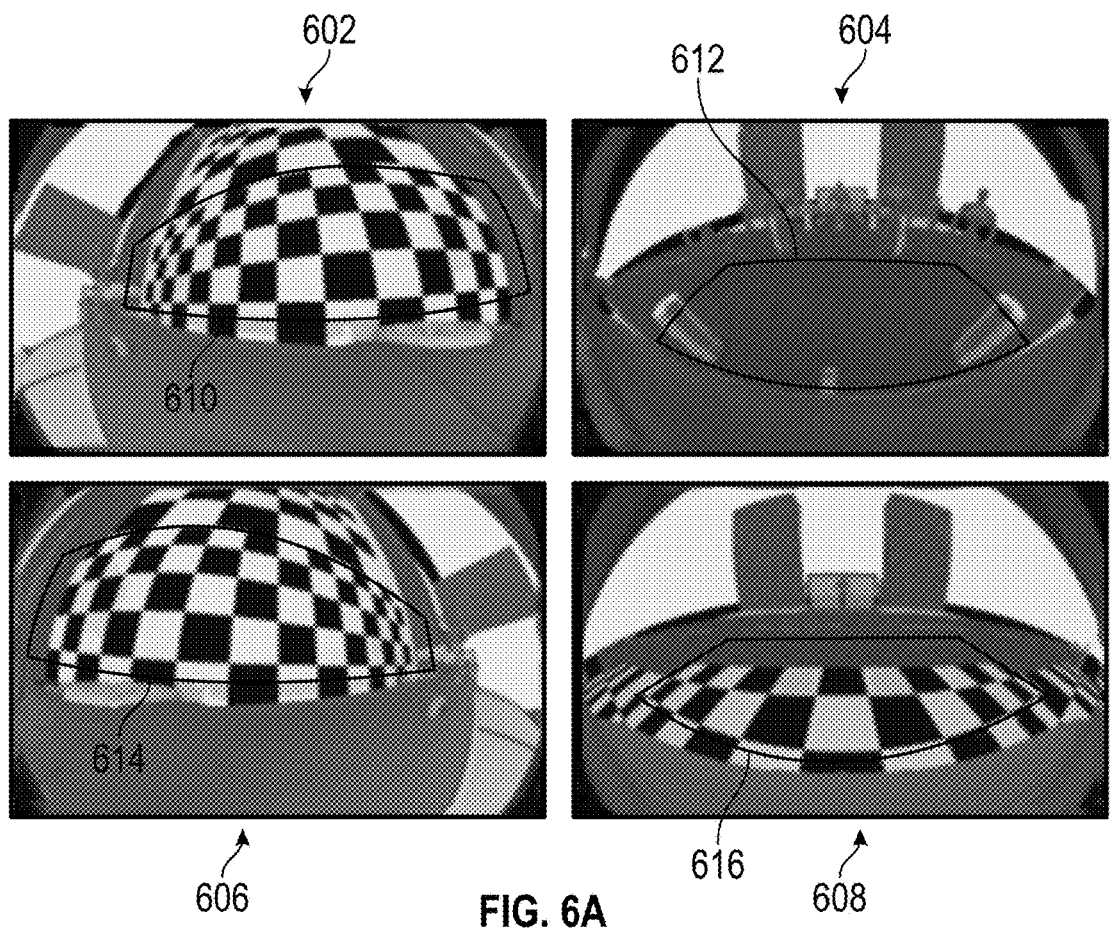
FIG. 6A is a diagram illustrating example field of views (FOVs) for multiple cameras on an example vehicle, in accordance with an embodiment.

FIG. 6A is a diagram illustrating example FOVs for multiple cameras (four in this example) on an example vehicle. The multiple FOVs include a front camera total FOV 602, a rear camera total FOV 604, a left camera total FOV 606, and a right camera FOV 608. The front camera has an IFOV 610, the rear camera has an IFOV 612, the left camera has a IFOV 614, and the right camera has an IFOV 616. Portions of the four IFOVs 610, 612, 614, 616, are stitched together to provide an image that may be displayed in a viewport.

Figure 6B:
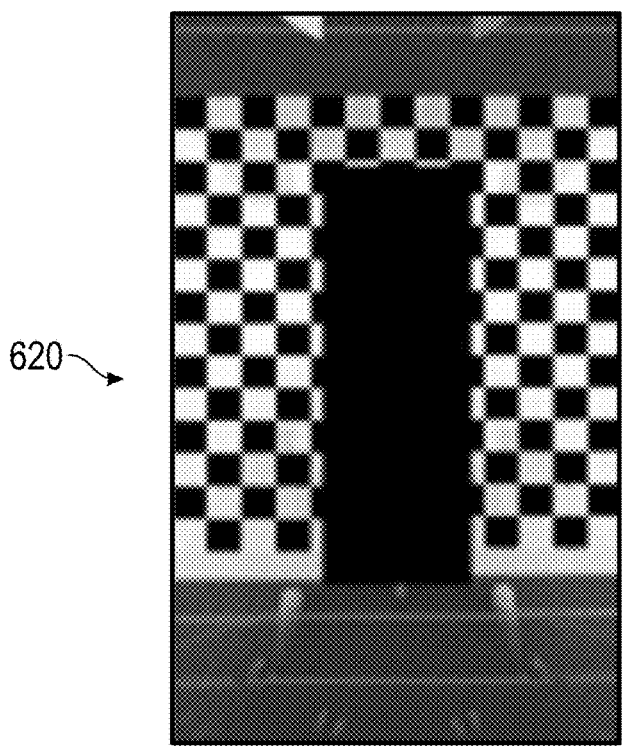
FIG. 6B is a diagram illustrating an example stitched together image constructed from portions of four instantaneous FOVs, in accordance with an embodiment.

FIG. 6B is a diagram illustrating an example stitched together image 620 constructed from the portions of the four IFOVs 610, 612, 614, 616. In this example, the image quality parameters for the front camera were determined based on the portion of the IFOV 610 that was used in the stitched together image 620. The image quality parameters for the rear camera were determined based on the portion of the IFOV 612 that was used in the stitched together image 620. The image quality parameters for the left camera were determined based on the portion of the IFOV 614 that was used in the stitched together image 620. The image quality parameters for the right camera were determined based on the portion of the IFOV 616 that was used in the stitched together image 620. This allows for the stitched together image 620 to have greater fidelity due to each camera that contributed to the image 620 having been specially tuned.

The apparatus, systems, techniques, and articles provided herein are illustrated in the foregoing examples in connection with a motor vehicle. In other examples and embodiments, the apparatus, systems, techniques, and articles provided may be used with cameras and image sensors in general without a connection to a motor vehicle.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system in a motor vehicle for real-time adjustment of image quality parameters for images taken by image sensors, the system comprising:
    an HMI (human machine interface) comprising a display screen in the motor vehicle;
    an optical imaging device on the motor vehicle;
    a controller, the controller configured to:
        acquire an image frame from the optical imaging device, the image frame having a fixed-pixel region that defines a region-of-interest for viewing on the display screen of the HMI, the region-of-interest including pixels representing an environment exterior to the motor vehicle and pixels representing one or more external components of the motor vehicle;
        determine a boundary for the region-of-interest in the fixed-pixel region that excludes the pixels representing the one or more external components of the motor vehicle by applying a morphological processing algorithm;
        based on the boundary, determine a modified fixed-pixel region by removing the pixels representing the one or more external components of the motor vehicle;
        alter a tone-mapping parameter to an altered tone-mapping parameter based on statistics of pixels in the modified fixed-pixel region;
        alter an auto-exposure parameter to an altered auto-exposure parameter based on statistics of the pixels in the modified fixed-pixel region; and
        provide the altered tone-mapping parameter and the altered auto-exposure parameter to the optical imaging devices for use with subsequent image frames; and
    wherein the optical imaging devices is configured to apply the altered tone-mapping parameter and the altered auto-exposure parameter produce an image of the region-of-interest that is tuned based on the altered tone-mapping parameter and the altered auto-exposure parameter;
    wherein the display screen of the HMI is configured to display the image of the region-of-interest that is tuned based on the altered tone-mapping parameter and the altered auto-exposure parameter.

2. The system of claim 1, wherein the controller is configured to:
    resize the fixed-pixel region in accordance with the boundary.

3. The system of claim 2, wherein the controller is further configured to:
    apply object recognition techniques to recognize the pixels representing the one or more external components of the motor vehicle in the fixed-pixel region.

4. The system of claim 2, wherein the controller is further configured to apply edge contouring processing techniques to determine the boundary for the region-of-interest in the fixed-pixel region that excludes the pixels representing the one or more external components of the motor vehicle.

5. The system of claim 4, wherein the display screen of the HMI is on a vehicle HMI.

6. The system of claim 1, wherein the display screen of the HMI is on a mobile device.

7. The system of claim 1, wherein the controller is further configured to:
    receive an indication that a series of images are to be captured for use with a consuming device; and
    instruct the motor vehicle to interact with the optical imaging devices to acquire a plurality of image frames for a viewport.

8. A method in a motor vehicle for real-time adjustment of image quality parameters for images taken by image sensors, the method comprising:
    acquiring an image frame from an optical imaging device on the motor vehicle, the image frame having a fixed-pixel region that defines a region-of-interest for viewing on a display screen of an HMI (human machine interface) in the motor vehicle, the region-of-interest including pixels representing an environment exterior to the motor vehicle and pixels representing one or more external components of the motor vehicle;
    determining a boundary for the region-of-interest in the fixed-pixel region that excludes the pixels representing the one or more external components of the motor vehicle;
    determining a modified fixed-pixel region by removing the pixels representing the one or more external components of the motor vehicle;
    altering a tone-mapping parameter to an altered tone-mapping parameter based on statistics of pixels in the modified fixed-pixel region;
    altering an auto-exposure parameter to an altered auto-exposure parameter based on statistics of the pixels in the modified fixed-pixel region;
    providing the altered tone-mapping parameter and the altered auto-exposure parameter to the optical imaging devices for use with subsequent image frames;
    applying, by the optical imaging device, the altered tone-mapping parameter and the altered auto-exposure parameter to produce an image of the region-of-interest that is tuned based on the altered tone-mapping parameter and the altered auto-exposure parameter; and
    displaying, by the display screen of the HMI, the image of the region-of-interest that is tuned based on the altered tone-mapping parameter and the altered auto-exposure parameter.

9. The method of claim 8, further comprising:
    resizing the fixed-pixel region in accordance with the boundary.

10. The method of claim 8, further comprising:
    applying object recognition techniques to recognize the pixels representing the one or more external components of the motor vehicle in the fixed-pixel region.

11. The method of claim 8, further comprising applying edge contouring processing techniques to determine the boundary for the region-of-interest in the fixed-pixel region that excludes the pixels representing the one or more external components of the motor vehicle.

12. The method of claim 8, further comprising applying morphological processing techniques to determine the boundary for the region-of-interest in the fixed-pixel region that excludes the pixels representing the one or more external components of the motor vehicle.

13. The method of claim 8, wherein the display screen of the HMI is on a mobile device.

14. The method of claim 8, further comprising:
receiving an indication that a series of images are to be captured for use with a consuming device; and
instructing the motor vehicle to interact with the optical imaging devices to acquire a plurality of image frames for a viewport.

15. A vehicle comprising:
an optical imaging devices;
a controller configured to:
acquire an image frame from the optical imaging device, the image frame having a fixed-pixel region that defines a region-of-interest for viewing on a display screen of an HMI (human machine interface), the region-of-interest including pixels representing an environment exterior to the vehicle and pixels representing one or more external components of the vehicle;
determine a boundary for the region-of-interest in the fixed-pixel region that excludes the pixels representing the one or more external components of the vehicle;
based on the boundary, determine a modified fixed-pixel region by removing the pixels representing the one or more external components of the vehicle;
alter a tone-mapping parameter to an altered tone-mapping parameter based on statistics of pixels in the modified fixed-pixel region;
alter an auto-exposure parameter to an altered auto-exposure parameter based on statistics of the pixels in the modified fixed-pixel region; and
provide the altered tone-mapping parameter and the altered auto-exposure parameter to the optical imaging devices for use with subsequent image frames; and
wherein the optical imaging device is configured to apply the altered tone-mapping parameter and the altered auto-exposure parameter to produce an image of the region-of-interest that is tuned based on the altered tone-mapping parameter and the altered auto-exposure parameter;
wherein the display screen of the HMI is configured to display the image of the region-of-interest that is tuned based on the altered tone-mapping parameter and the altered auto-exposure parameter.

16. The vehicle of claim 15, wherein the controller is configured to:
resize the fixed-pixel region in accordance with the boundary.

17. The vehicle of claim 15, wherein the controller is further configured to:
apply object recognition techniques to recognize the pixels representing the one or more external components of the vehicle in the fixed-pixel region.

18. The vehicle of claim 15, wherein the controller is further configured to apply edge contouring processing techniques to determine the boundary for the region-of-interest in the fixed-pixel region that excludes the pixels representing the one or more external components of the vehicle.

19. The vehicle of claim 15, wherein the controller is further configured to apply morphological processing techniques to determine the boundary for the region-of-interest in the fixed-pixel region that excludes the pixels representing the one or more external components of the vehicle.

20. The vehicle of claim 15, wherein the display screen of the HMI is on a mobile device.

* * * * *